Patented Oct. 10, 1922.

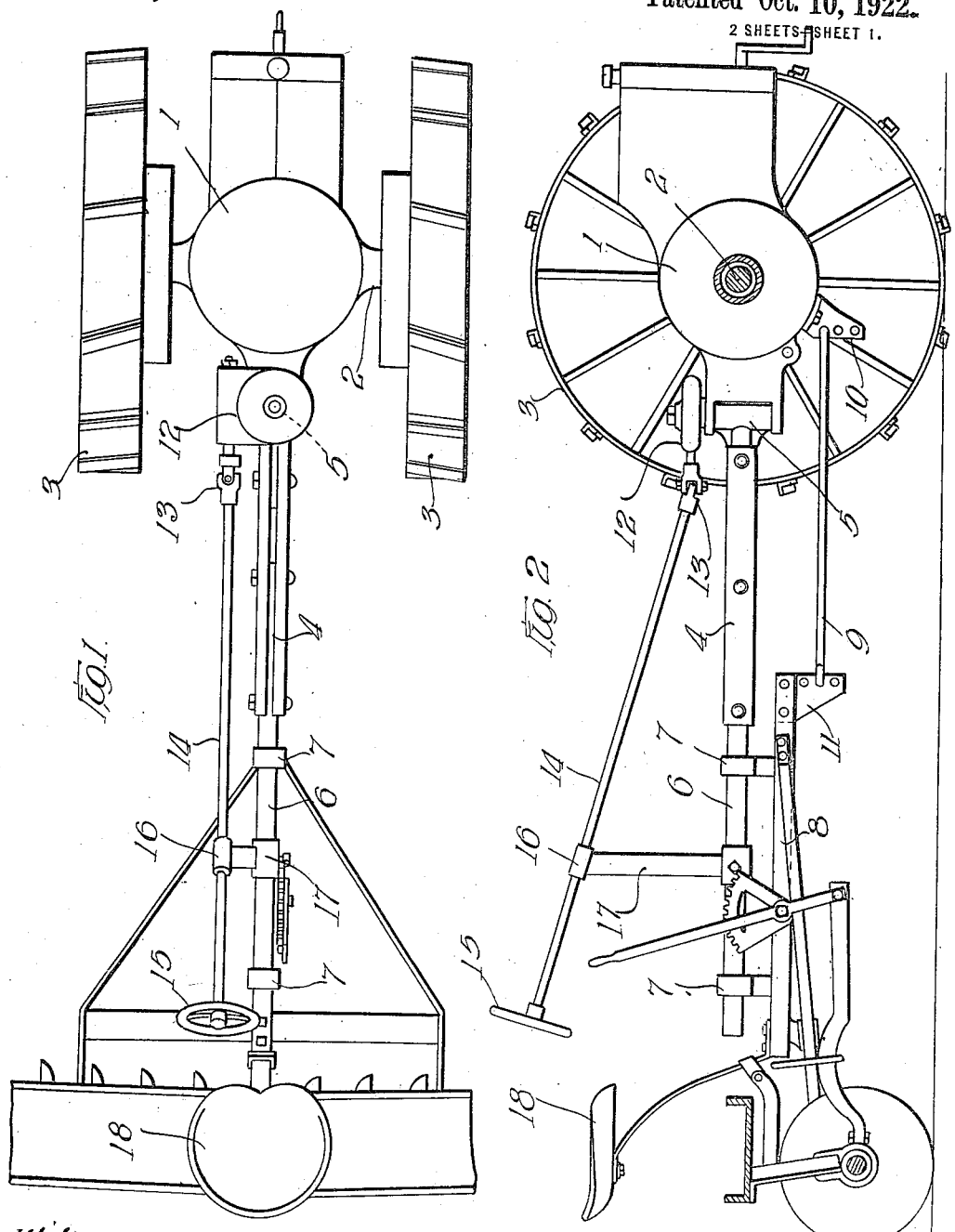

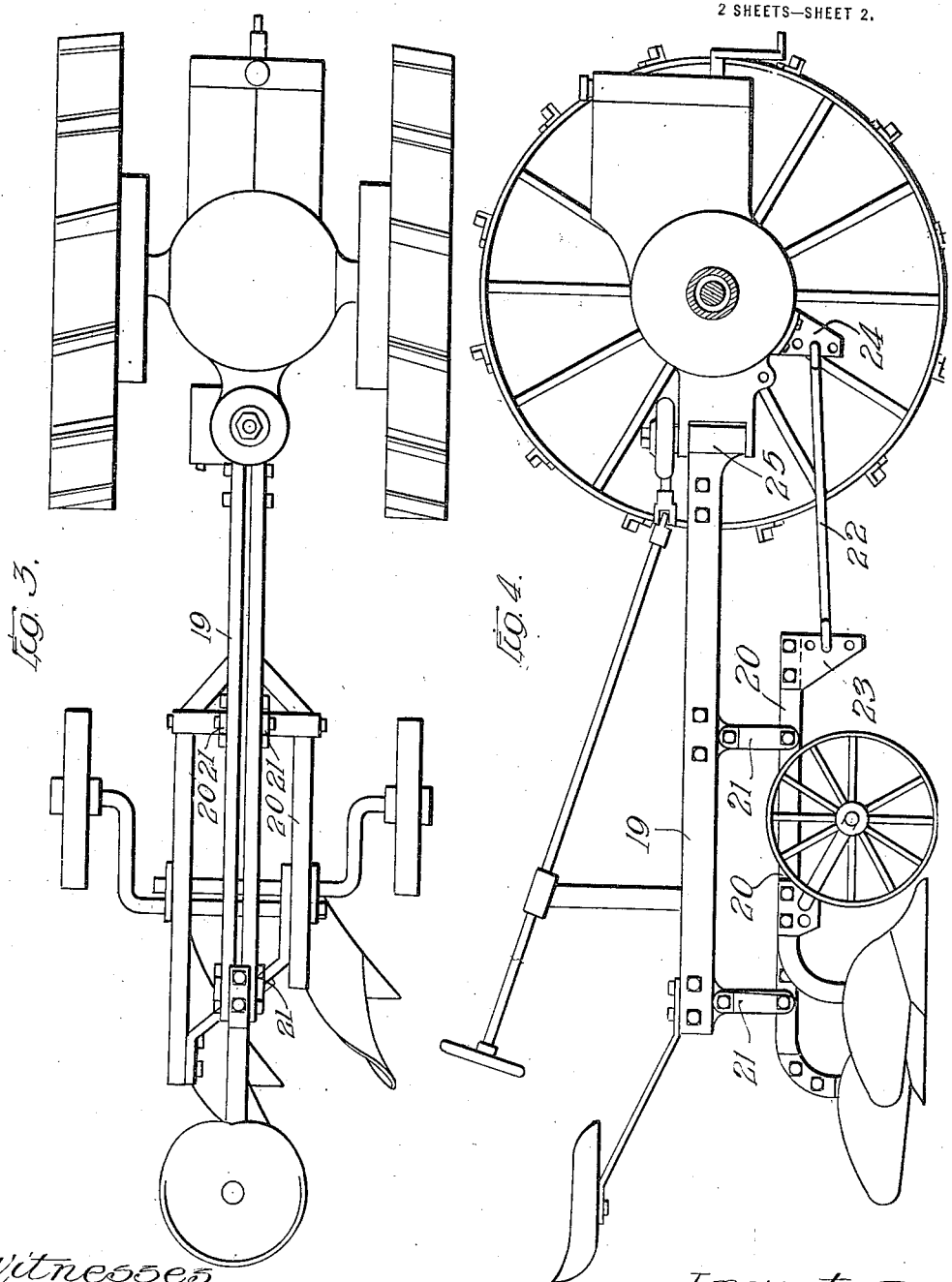

1,431,311

UNITED STATES PATENT OFFICE.

ALVARO S. KROTZ, OF JANESVILLE, WISCONSIN.

TRACTOR.

Application filed January 22, 1920. Serial No. 353,279.

*To all whom it may concern:*

Be it known that I, ALVARO S. KROTZ, a citizen of the United States of America, and a resident of Janesville, Wisconsin, have invented a certain new and useful Improvement in Tractors, of which the following is a specification.

This invention relates to two-wheeled tractors having means for hauling a plow or cultivator or harrow or other agricultural implement, or other things, and having separate means for maintaining the equilibrium of the tractor, thereby to keep it from tilting forward or backward, so that one connection sustains the draft, while the other connection is entirely independent thereof and sustains no draft whatever.

Generally stated, therefore, the object of the invention is to provide a novel and improved construction whereby the reach or connection which sustains no draft, and which performs the function of keeping the tractor from tilting forward or backward, serves also to skew the plow or cultivator or harrow or other implement sidewise, when the direction of travel is changed, or when the tractor is turned to the right or the left, so that the implement or other machine will be maintained in alinement with the said reach which extends rearward from the tractor, and which has unlimited endwise sliding movement on the implement, whereby the separate draft connection restores both the forward pull and the backward push of the tractor.

It is also an object to provide certain details and features of construction and combinations tending to increase the general efficiency and the desirability of a two-wheeled tractor of this particular character.

To these and other useful ends the invention consists in matters hereinafter set forth and claimed, and shown in the accompanying drawings, in which—

Fig. 1 is a plan of a tractor embodying the principles of the invention, showing the same hitched to a cultivator.

Fig. 2 is a side elevation of the structure shown in Fig. 1.

Fig. 3 is a view similar to Fig. 1, showing the tractor hitched to a wheeled plow.

Fig. 4 is a side elevation of the structure shown in Fig. 3.

As thus illustrated, referring to Figs. 1 and 2, the tractor comprises an engine having its casing 1 constructed to form the body of the tractor, being mounted on an axle 2 which is supported by traction wheels 3 of any suitable character. The reach 4 has its forward end provided with a vertical pivot 5 on the rear end of the tractor body, and has its rear end portion 6 rounded to slide in guides 7 on the frame 8 of the cultivator or other agricultural implement. With this arrangement, the reach 4 keeps the tractor from tilting forward or backward, and also supports the implement frame 8 in horizontal position. In addition, when the direction of travel of the tractor is changed, the reach 4, notwithstanding that it has free endwise sliding movement in the guides 7, so that it is entirely incapable of serving as a draft connection, serves also to skew the cultivator or other implement to the right or the left, so that said implement is retained in alinement with said reach. It will be seen, however, that because the portion 6 of the reach is cylindric or rounded, it can oscillate about a longitudinal axis in the guides 7, whereby the tractor can tilt sidewise relatively to the cultivator or other implement in passing over uneven ground, in a manner that will be readily understood.

The draft connection comprises a draft rod 9 which connects the bracket 10 on the tractor frame or body with the bracket plate 17 on the front end of the implement frame. As the front end of the rod 9 is some distance forward of the pivot 5, it follows that the rod 9 will swing laterally at its forward end, relatively to the implement frame. Thus the draft is always on the rod 9 and no draft is imposed on the reach 4 so that the removal of the rod 9 or any other draft connection employed in place thereof, would leave the structure without any operative draft connection between the tractor and the implement.

A worm gear 12 is associated with the pivot 5, at the top thereof, in any suitable manner, and connected through a universal joint 13 with a rod 14 which has a hand wheel 15 at the rear end thereof, said rod 14 being mounted in a bearing 16 at the upper end of a standard 17 carried by the cylindric portion 6 of the reach. The hand wheel 15 is within reach of the driver who occupies the seat 18 provided in the usual manner on the implement.

As shown in Figs. 3 and 4, the construction of the tractor is the same as previously shown and described, but in this case the frame 20 of a wheeled plow, by vertically disposed links 21, which links are pivoted at their upper and lower ends to swing forward and backward, whereby the reach 19 is maintained parallel with the frame of the implement, but is incapable of serving as a draft connection. Therefore, the draft rod 22, which is similar to the one previously described, is provided to connect the plate 23 on the forward end of the wheeled plow with the bracket plate 24 on the bottom of the tractor body, and this rod 22 sustains the entire draft. It will be understood that any suitable steering gear can be employed to control the pivotal connection 25 at the front end of the reach, which is like the one previously described, such steering gear being substantially the same as that shown in Figs. 1 and 2. Thus, in Figs. 3 and 4, it is true that the reach 19 not only keeps the tractor from tilting forward or backward, but serves also to keep the wheeled plow in proper position, and serves to skew the wheeled plow when the direction of travel is changed.

In either case, therefore, as shown in either Fig. 2 or Fig. 4, the reach sustains no draft whatever, but does serve (in addition to keeping the tractor from tilting forward or backward) to maintain the implement in an approximately horizontal position, such implement being of the kind which requires something to maintain the equilibrium thereof, as is characteristic of two-wheeled implements as distinguished from those which have four wheels or three wheels which enable them to stand and travel alone. In other words, with the construction shown and described, the reach enables the implement to keep the tractor from tilting forward or backward, and enables the tractor to maintain the implement in approximately horizontal position. In addition to this, the reach serves to skew the implement to the right or the left when the direction of travel is changed. Thus the reach is incapable of sustaining any draft, and is not intended to sustain any draft, but does sustain the various strains incident to the skewing of the implement to the right or the left, and the maintaining of the implement in horizontal, or approximately horizontal, position during the operation thereof.

As shown, the reach that extends rearwardly from the tractor is capable of endwise movement relatively to the implement, or other machine, and desirably has this endwise shifting movement because the draft rod or draw bar which sustains the draft is a single piece affair, and has its forward end disposed some distance ahead of the forward end or pivotal point of the reach. Consequently, when the direction of travel is changed, as when the tractor turns to the right or the left, the reach shifts endwise relatively to the implement. The draft connection 9 serves not only to pull the implement forward, but also to push the implement backward, as the reach 6 has unlimited endwise movement on the implement.

Of course, the implement or device shown in either Figure 4 or in Figure 2 is an unstable one, as in either case the implement is adapted to tilt about a horizontal axis, and will tilt in this manner unless thus held or maintained horizontally while in operation. In either case, therefore, the reach 4 and 6 or 19 serves exclusively as a stabilizing and steering member, having no draft functions whatever. In either case, it will be seen that the reach necessarily has endwise movement on the trailer or implement or other device to be pulled or hauled, inasmuch as the draft connection 9 or 22 is so arranged that the reach must slide forward when the tractor turns to the right or to the left, and as the draft connection is not a chain and cannot drop down and become slack when the direction of travel is changed. Therefore, the capacity for endwise movement or a displacement of the reach on the implement or other device is for the purpose of permitting the use of a draft connection which extends from the forward end of the implement to a point ahead of the hinge between the reach and the tractor, and to permit turning of the tractor to the right or to the left.

The tractor, of course, is an unstable one, in the sense that when left alone it will tilt forward or backward, and the agricultural implement or trailer is also an unstable device in the same sense, for without the reach this device has nothing to prevent it from tilting forward or backward.

What I claim as my invention is:—

1. In combination with a device to be pulled or dragged over the ground, a two-wheeled tractor having motive power supported entirely by the two wheels thereof, a stabilizing and steering reach inoperative as a draft connection between the tractor and said device but operative to keep the tractor from tilting forward and backward, as well as to prevent said device from tilting forward, and a separate draft connection to sustain the forward pull and the backward push from the tractor to the front end of said device, so that said reach is exclusively a stabilizing and steering member, in combination with means disposed in rear of said draft connection and whereby said reach is supported for endwise movement on said device when the tractor turns to the right or the left and is operative as a steering member to skew the device laterally when the direction of travel is changed.

2. A structure as specified in claim 1, in combination with means to control the steering of the tractor from a position on said device.

3. A structure as specified in claim 1, having provisions whereby said tractor is free to tilt sidewise about a longitudinal axis relatively to said device.

4. A two-wheeled tractor for hauling different kinds of agricultural implements or other things which are adapted to be pulled by horses, having a steering reach for connection to the thing forming the trailer to be pulled, so that the tractor will be prevented from tilting forward or backward on its single pair of wheels, means for loosely supporting the rear end of the reach for necessary endwise movement when the tractor turns to the right or the left, and to prevent any draft thereon by the implement or other thing being hauled, except what strain is necessary to enable the reach to serve as a steering member to skew the implement laterally when the direction of travel is changed, as well as to keep the implement from tilting forward or backward, so that said reach is inoperative to communicate either a forward pull or a backward push to said trailer, and a separate pulling and pushing draft connection combined with said steering reach to couple the tractor to the draft means ordinarily provided on the forward end of any such implement or other thing.

5. A structure as specified in claim 4, in which means are provided for controlling said tractor from the seat of the implement.

6. A structure as specified in claim 1, said draft connection comprising a rod which extends forward from the implement to a point some distance ahead of the forward end of the reach.

7. A structure as specified in claim 4, said draft connection comprising a laterally swinging rod which extends forward from the implement to a point some distance ahead of the forward end of the reach.

8. A structure as specified in claim 1, said reach being adapted to oscillate about a longitudinal axis relatively to said device, whereby said device and tractor are each adapted to tilt sidewise relatively to the other while traveling over uneven ground.

9. A structure as specified in claim 4, said reach being adapted to oscillate about a longitudinal axis relatively to the implement, so that the tractor and reach are adapted to tilt sidewise about a longitudinal axis relatively to the implement while passing over uneven ground.

10. A structure as specified in claim 1, said reach and draft connection being so relatively arranged that the reach necessarily has endwise shifting movement relatively to said device when the tractor changes its direction of travel and turns to the right or the left.

11. A structure as specified in claim 4, said draft connection consisting of a rigid draw bar which extends from the implement to the tractor, with its forward end some distance ahead of the forward end of the reach, so that said reach necessarily has an endwise shifting movement relatively to the implement when the tractor turns to the right or the left.

12. In a motor driven vehicle, the combination of front traction means, motive power means whereby to operate said traction means, a steering reach pivoted on said traction means to swing laterally, a structure forming a trailer behind said traction means, steering means for controlling the direction of travel, means on said trailer whereby said reach has only endwise movement relatively to the trailer, when the direction of travel is changed, so that the reach is inoperative as a draft connection but is operable as a steering member to skew the trailer to the right or the left, and a separate draft connection without which the vehicle is inoperative to pull the trailer and which is disposed below the steering reach to communicate both the forward pull and the backward push from said traction means to said trailer.

13. In combination with an unstable device to be pulled, a two-wheel unstable tractor, a steering reach connecting said device and tractor to prevent them from tipping forward or backward, the reach being so connected to the device that it has free endwise movement thereon, but acts as a steering means for skewing the device, whereby said reach is exclusively a stabilizing and steering member, and a relatively low drawbar connecting said device and tractor to hold them a fixed distance apart and to sustain all draft required for pulling and pushing the device and adapted to cause forward movement of said steering reach relatively to said device when the tractor turns to the right or the left.

14. In combination with an unstable device to be pulled and an unstable tractor, a steering reach connecting said device and tractor to prevent either from tipping forward or backward, said reach being vertically hinged at its forward end to the tractor and so connected to the device that it has free endwise movement relatively to the device, when the tractor turns to the right or the left, but acting as a rigid guiding means for the device and a rudder to the tractor, to permit the tractor to be turned to the right or left through the reach hinge, and a relatively low draw-bar combined with said steering reach and connecting said device and tractor to hold them a fixed distance apart and to sustain all draft required to move said device forward or backward.

15. A structure as specified in claim 14, the rear end of the draw-bar being in rear of the hinge and the front end being considerably in front of the hinge, so that when the tractor is guided to the right or left the draw-bar will have an angle in the same direction, relatively to said reach, so as to assist in guiding the device.

16. The combination of a tractor, a trailer to be pulled by the tractor, a pivoted reach extending rearwardly from the tractor, means whereby said reach is operative to exercise steering control over said trailer, but is inoperative to pull or push the trailer, and a pulling and pushing draft connection combined with said reach to enable the tractor to pull the trailer forward and push the trailer backward when necessary.

17. A structure as specified in claim 16, said means being disposed entirely in rear of said draft connection.

18. A structure as specified in claim 16, said draft connection being connected to the tractor at a point some distance ahead of the pivot of said reach, whereby said reach necessarily has endwise displacement on said trailer when the tractor turns to the right or the left.

ALVARO S. KROTZ.